United States Patent
Yoon et al.

(10) Patent No.: US 9,410,005 B2
(45) Date of Patent: Aug. 9, 2016

(54) POLYMER, PREPARATION METHOD THEREOF, COMPOSITION AND FILM COMPRISING THE SAME

(71) Applicant: LG Chem, Ltd., Seoul (KR)

(72) Inventors: Jeong Ae Yoon, Daejeon (KR); No Ma Kim, Daejeon (KR); Su Jeong Kim, Daejeon (KR); In Ho Hwang, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 14/554,426

(22) Filed: Nov. 26, 2014

(65) Prior Publication Data

US 2015/0080524 A1   Mar. 19, 2015

Related U.S. Application Data

(63) Continuation of application No. PCT/KR2013/004886, filed on Jun. 3, 2013.

(30) Foreign Application Priority Data

Jun. 1, 2012 (KR) .................. 10-2012-0059124
Jun. 3, 2013 (KR) .................. 10-2013-0063479

(51) Int. Cl.
| | | |
|---|---|---|
| *C08F 220/18* | (2006.01) | |
| *C09D 133/12* | (2006.01) | |
| *C08F 214/18* | (2006.01) | |
| *C08J 5/18* | (2006.01) | |
| *C08F 212/08* | (2006.01) | |
| *C08F 220/14* | (2006.01) | |
| *C08F 293/00* | (2006.01) | |
| *C08L 53/00* | (2006.01) | |
| *C09D 127/12* | (2006.01) | |

(52) U.S. Cl.
CPC ............ *C08F 220/18* (2013.01); *C08F 212/08* (2013.01); *C08F 214/18* (2013.01); *C08F 220/14* (2013.01); *C08F 293/005* (2013.01); *C08J 5/18* (2013.01); *C08L 53/00* (2013.01); *C09D 127/12* (2013.01); *C09D 133/12* (2013.01); *C08F 2438/01* (2013.01); *C08J 2327/22* (2013.01); *C08J 2333/12* (2013.01)

(58) Field of Classification Search
CPC .......................... C08F 220/18; C09D 133/12
See application file for complete search history.

(56) References Cited

U.S. PATENT DOCUMENTS

| | | | |
|---|---|---|---|
| 6,342,569 | B1 | 1/2002 | Manzoni et al. |
| 7,893,174 | B2 | 2/2011 | Matyjaszewski et al. |
| 2007/0244262 | A1* | 10/2007 | Zhang .................. C08F 259/08 525/242 |
| 2010/0189946 | A1 | 7/2010 | Hochstetter et al. |

FOREIGN PATENT DOCUMENTS

| | | |
|---|---|---|
| EP | 2857425 A1 | 4/2015 |
| JP | 63-072732 A | 4/1988 |
| KR | 10-0796987 B1 | 1/2008 |
| KR | 2010-0036267 A | 4/2010 |
| KR | 2010-0072967 A | 7/2010 |

OTHER PUBLICATIONS

International Search Report for PCT/KR2013/004886, dated Sep. 10, 2013.
Supplemental Search Report from European Application No. 13 79 6676, dated Oct. 16, 2015.

* cited by examiner

*Primary Examiner* — Robert Harlan
(74) *Attorney, Agent, or Firm* — Lerner, David, Littenberg, Krumholz & Mentlik, LLP

(57) ABSTRACT

Provided is a polymer, a composition and film comprising the polymer, and a preparation method of the polymer. The polymer includes a compound having a hydrophobic property at its terminal, and thus a film capable of having a hydrophobic surface can be provided at the same time when the film is formed without a separate surface treatment. Further, an effect capable of permanently hydrophobically modifying a film surface is obtained at a low cost and a composition that does not occur a phase separation phenomenon in a polymer solution state is provided. For example, the film is used as a water repellent coating film, an anti-contamination film, or the like.

12 Claims, No Drawings

POLYMER, PREPARATION METHOD THEREOF, COMPOSITION AND FILM COMPRISING THE SAME

CROSS REFERENCE TO RELATED APPLICATIONS

The present application is a continuation of International Application No. PCT/KR2013/004886 filed Jun. 3, 2013, which claims the benefit of the filing date of Korean Patent Application Nos. 10-2012-0059124 filed Jun. 1, 2012 and 10-2013-0063479 filed Jun. 3, 2013, the disclosures of which are hereby incorporated herein by reference.

TECHNICAL FIELD

The present application relates to a polymer, a preparation method thereof, and a compositions and film comprising the same.

BACKGROUND ART

A hydrophobic film can be used in various fields. For example, a surface for preventing contamination on a substrate of a solar cell may be coated with a polymer film having a hydrophobic surface. Also, hydrophobic films can be used as water repellent coatings of antifogging glasses, automotive glass, or the like.

As examples to provide a hydrophobic property to a film, there are generally used methods of performing fluorine plasma treatment on a polymer film or adding a fluorine-based surfactant to a polymer solution followed by the coating of the polymer solution.

SUMMARY OF THE INVENTION

The present application is directed to providing a polymer, a preparation method thereof, and a composition and film comprising the same.

The present application relates to a polymer. In an example, the polymer may include a fluorine-based compound having a hydrophobic property at its terminal. Thus, when a film is formed by using a composition containing the polymer, a surface of the formed film may have a hydrophobic property even without a separate surface treatment. Further, the polymer has an excellent compatibility with a polymer solution in the composition. Therefore, a phase separation phenomenon does not occur in the composition.

In an example, the polymer may be a polymer represented by the following Chemical Formula 1.

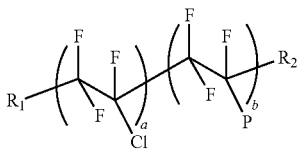

[Chemical Formula 1]

In Chemical Formula 1, $R_1$ and $R_2$ each independently represent —F or —$CF_3$, P represents a polymer whose terminal is coupled to a carbon atom, a satisfies an integer of 1 to 95, and b satisfies an integer of 1 to 5.

In an example, like the compound represented by Chemical Formula 1, in the polymer, some chlorotrifluoroethylene (hereinafter, referred to as "CTFE") monomer units in a CTFE oligomer may be bound to a polymer P. The CTFE oligomer is a fluorine-based compound and may be a compound for giving a hydrophobic property to a polymer surface. Further, as described below, since the CTFE oligomer is positioned at a terminal of the polymer P, it is possible to prepare a polymer film having a hydrophobic surface without a separate surface treatment, only by using a composition containing the polymer. Furthermore, the CTFE oligomer may act as a multifunctional macro initiator when the polymer is prepared.

The term "terminal" used herein may mean a terminal of a main chain of a polymer or a branched chain grafted from the main chain, and the terminal may mean an outermost part of the polymer or a region to be actually included in an outer part of the polymer, that is, an actual terminal.

In Chemical Formula 1, the polymer P can be formed by the activation of some of Cl elements within the CTFE oligomer with a catalyst, addition of vinyl-based monomers to the activated positions of the polymer, and continuous polymerization of the vinyl-based monomers. Therefore, the P may include a polymeric unit of the vinyl-based monomer. Further, the compound of Chemical Formula 1 can be classified into a repetition unit b in which the vinyl-based monomer is bound to a position of Cl of a CTFE monomer, and a repetition unit a of the CTFE monomer to which the vinyl-based monomer is not bound.

The polymer is not particularly limited in its form and may be, for example, a block copolymer, an alternating copolymer, or a random copolymer.

The repetition unit b in which a chloride element (Cl) of the CTFE oligomer is substituted may be an integer of 1 to 5, for example, 1 to 3, 2 to 4, 1 to 4, 1 to 2, 2 to 3, and preferably, 1 to 2. When the b is 1 or greater, a hydrophobic modification effect of a film can be achieved by the polymer P. When the b is greater than 5, the CTFE repetition unit a is not positioned at a terminal of the polymer P, and thus, the effect of hydrophobic property modification can be remarkably decreased which has been expected from the polymer film surface made of the composition.

The CTFE repetition unit a in which the vinyl-based monomer is not bound may be an integer of 1 to 95, for example, 1 to 50, 1 to 25, and preferably, 1 to 8. As described above, the CTFE repetition unit a has a value much greater than that of the repetition unit b. Thus, even when the repetition unit b is positioned between the repetition units a, it is possible to obtain the same effect as a case where the CTFE oligomer is positioned at the terminal of the polymer P.

Herein, a+b satisfies an integer of 2 to 100. When the a+b satisfies an integer of 2 to 100, the repetition unit b can be maintained to satisfy an integer of 1 to 5 and in this case, the CTFE repetition unit a can be an integer of 1 to 95. Therefore, as described above, the CTFE repetition unit a has a value much greater than the repetition unit b. Thus, even when the repetition unit b is positioned between the repetition units a, it is possible to obtain the same effect as a case where the CTFE oligomer is positioned at the terminal of the polymer P.

In an example, preferably, the a+b may satisfy an integer of 1 to 10 and in this case, the repetition unit may be maintained to be 1 or 2.

In Chemical Formula 1, $R_1$ and $R_2$ independently represent —F or —$CF_3$. For example, when the $R_1$ and $R_2$ are alkyl groups having 2 or more carbon atoms, even if the CTFE oligomer is positioned at the terminal of the polymer P within the polymer, a surface of the polymer film made of the composition containing the polymer may not have a hydrophobic property.

In an example, a molecular weight distribution of the polymer is in a range of 1.01 to 1.6. In order to maintain a repetition unit b in which a vinyl-based monomer is polymerized to a CTFE oligomer to be an integer of 1 to 5, it may be difficult to measure the b during a preparation process of a polymer but it is possible to obtain a qualitative result by measuring a molecular weight of a prepared polymer sample. Further, it is possible to qualitatively determine whether living radical polymerization is carried out well based on a molecular weight distribution. For example, when a molecular weight distribution of the polymer is in a range of 1.01 to 1.6, a polymer having a structure as represented by Chemical Formula 1 can be obtained by living radical polymerization. Herein, the term "molecular weight distribution" may mean a ratio of a weight average molecular weight with respect to a number average molecular weight (Mw/Mn), unless context dictates otherwise.

In Chemical Formula 1, the terminal of the polymer P is coupled to a carbon atom of the CTFE monomer, and as described above, the polymer P may contain a polymerization unit in which a vinyl-based monomer is polymerized.

In an example, the vinyl-based monomer is an unsaturated compound containing a vinyl group and may include a functional group such as an amine group, an epoxy group, an isocyanate group, or the like, and for example, a methacrylic acid ester-based monomer, an acrylic acid ester-based monomer, an aromatic vinyl-based monomer, a vinyl ester monomer, an acrylonitrile-based monomer or a maleimide-based monomer, an acrylamide-based monomer, and the like may be used.

In an example, as the vinyl-based monomer, (meth)acrylic acid ester-based monomers such as methyl (meth)acrylate, ethyl (meth)acrylate, n-propyl (meth)acrylate, isopropyl (meth)acrylate, n-butyl (meth)acrylate, t-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate, or tetradecyl (meth)acrylate; hydroxyl group-containing unsaturated monomers such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono (meth)acrylate, N-(2-hydroxyethyl) (meth)acrylamide, glycerin mono(meth)acrylate, polyethylene glycol mono(meth) acrylate, polypropylene glycol mono(meth)acrylate, and 2-hydroxy-3-phenoxypropyl (meth)acrylate, 2-(meth)acryloyloxyethyl-2-hydroxyethyl phthalate, and terminal hydroxyl group-containing lactone-modified (meth)acrylate; isocyanate group-containing unsaturated monomers such as 2-(meth)acryloyloxyethylisocyanate, and 2-(2-(meth)acryloyloxyethoxy)ethylisocyanate; glycidyl group-containing unsaturated monomers such as glycidylmethcrylate, and 4-hydroxybutyl acrylate glycidyl ether; aromatic vinyl-based monomers such as styrene, α-methylstyrene, p-methylstyrene, and p-methoxystyrene; maleimide-based monomers such as maleimide, methyl maleimide, ethyl maleimide, propyl maleimide, butyl maleimide, hexyl maleimide, octyl maleimide, dodecyl maleimide, stearyl maleimide, phenyl maleimide, and cyclohexyl maleimide; acrylamide-based monomers such as acrylamide, N-methylacrylamide, N,N-dimethylacrylamide, and N-isopropylacrylamide; vinyl-based ester monomers such as vinyl acetate, and vinyl laurate; or acrylonitrile-based monomers such as acrylonitrile, and meth acrylonitrile and combinations of two or more of the foregoing may be used, but the present invention is not limited thereto.

In an example, the polymer may be represented by the following Chemical Formula 2.

[Chemical Formula 2]

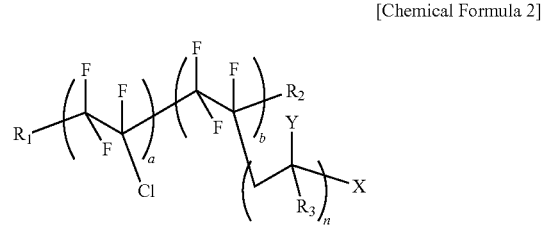

In Chemical Formula 2, $R_1$, $R_2$, P, a, and b are the same as defined above, $R_3$ represents hydrogen or an alkyl group having 1 or 2 carbon atoms. X represents an element which can be positioned at a part where a Cl radical can be reversibly added after the Cl radical is separated from a C—Cl bond of the CTFE, during which time the radical polymerization between the CTFE oligomer and vinyl-based monomers occurs to form a polymer chain P. The X may be a chlorine atom (Cl) or other alternative elements. The other alternative elements may be elements having 1 outermost electron such as hydrogen or halogen.

Further, in Chemical Formula 2, Y represents a functional group which is substituted or not substituted by hydrogen, an alkyl group or an alkoxy group having 1 to 12 carbon atoms, a hydroxyl group, or $SO_3R_4$ ($R_4$ represents hydrogen or alkyl having 1 to 12 carbon atoms) and various functional groups may be applied thereto depending on a use and a property of the hydrophobic polymer. For example, as the functional group, a phenyl group, halogen, an alkoxy group having 1 to 12 carbon atoms, an alcohol group, $CO_2Z$ (Z represents alkyl which is substituted or not substituted by a hetero element or halogen and has 1 to 12 carbon atoms), or $CONR_5R_6$ ($R_5$ and $R_6$ independently represent hydrogen or alkyl having 1 to 12 carbon atoms) may be used and combinations of two or more of the foregoing may be used, but the present invention is not limited thereto.

In Chemical Formula 2, n represents a degree of polymerization of the polymer P and may satisfy an integer of 10 to 50000. For example, the n may be an integer of 10 to 45000, 1000 to 30000, 5000 to 40000, 10000 to 35000, 20000 to 30000, and the like.

In an example, a content of CTFE in the polymer may be in a range of 0.005 to 30 wt. %. The content of CTFE in the polymer can be measured by, for example, elementary analysis. When the content of CTFE is less than 0.005 wt. %, the CTFE repetition unit a is not positioned at the terminal of the polymer P, and thus, a hydrophobic property modification effect of a film surface made of the composition containing the polymer is remarkably decreased. When the content of CTFE is more than 30 wt. %, there may be a compatibility problem with a matrix polymer.

Further, in the polymer, the relation of b/(a+b) may be in a range of 0.05 to 0.4. The relation of b/(a+b) means an initiation efficiency ($M_{n,theo}/M_{n,real}$), and the $M_{n,theo}$ represents a theoretical molecular weight of the polymer which can be calculated by the following Formula 1.

$M_{n,theo}$=a number average molecular weight of a CTFE oligomer before a vinyl-based monomer is polymerized+[(a molar amount of a vinyl-based monomer/molar amount of Cl in the CTFE oligomer before polymerization)×a conversion of the vinyl-based monomer×a molecular weight of the vinyl-based monomer)  [Formula 1]

The $M_{n,real}$ represents a number average molecular weight of the polymer measured by gel permeation chromatography (GPC) using a calibration curve obtained from standard polystyrenes.

In the present application, when the relation of b/(a+b) of the polymer is in a range of 0.05 to 0.4, the CTFE oligomer may be positioned at the terminal of the P, and effects thereof are the same as described above.

In the polymer, the CTFE oligomer is covalently bound to the terminal of the polymer P as shown in Chemical Formula 1. Therefore, the polymer can prevent a phase separation phenomenon between a polymer solution and a fluorine-based surfactant which has been conventionally used to modify a polymer film to have a hydrophobic property.

The present application also relates to a composition containing the above-described polymer. Since the composition contains the above-described polymer, when a film is formed by using the composition, it is possible to hydrophobically modify a film surface at low costs. Also, when a fluorine-based surfactant is added to a polymer solution to perform a hydrophobic treatment, a phase separation between the polymer solution and the fluorine-based surfactant does not occur.

In the composition, a content of the polymer may be in a range of 1 wt. % to 100 wt. % with respect to the total weight of the composition. For example, the content of the polymer may be in a range of 20 wt. % to 50 wt. %, 40 wt. % to 80 wt. %, and 40 wt. % to 50 wt. % with respect to the total weight of the composition. In the above-described range, the formed polymer film shows an excellent hydrophobic property modification effect. When the content of the polymer is less than 1 wt. %, the polymer film may show an insufficient hydrophobic property modification effect. Even if the composition is composed of the polymer only, it is possible to obtain a hydrophobic property modification effect of a polymer film surface made of the composition.

The composition may further contain a surfactant. When a surfactant is contained in the composition, the surfactant reduces a surface tension of the composition and helps the formation of a film.

The surfactant can be employed from various surfactants commonly known in the art, such as anionic surfactants, cationic surfactants, and nonionic surfactants. For example, soap, alkyl benzene sulfonic acid salt, α-olefin sulfonic acid salt, alkyl sulfuric acid ester salt, alkyl ether sulfuric acid ester salt, alkane sulfonic acid salt, N-acyl-N-methyltaurine salt, sulfosuccinic acid dialkyl ester salt, phosphoric acid ester salt, polyethylene glycol, polyol, a fluorine-based compound, a silicon-based compound, or their derivatives may be used, but the present invention is not limited thereto.

A content of the surfactant may be in a range of 0.1 to 10 parts by weight with respect to 100 parts by weight of the composition. For example, the content of the surfactant may be in a range of 1 part by weight with respect to 6 parts by weight, 3 parts by weight with respect to 8 parts by weight, 4 parts by weight with respect to 5 parts by weight with respect to 100 parts by weight of the composition. In the above-described range, the composition may show the most excellent surface tension reduction effect. When the content of the surfactant is more than 10 parts by weight, costs may be excessively increased and a phase separation phenomenon may occur in the composition.

The present application further relates to a film formed by using the above-described composition. The film is made of the above-described composition containing the polymer, and thus, a surface of the film can be modified to have a hydrophobic property without a separate surface treatment.

The hydrophobic film can be used for, but not limited to, a water repellent coating film or an anti-contamination film and can be applied to various industrial fields.

In an example, the present application relates to a preparation method of the polymer.

For example, the polymer may be prepared by mixing and polymerizing a polymerizable vinyl-based monomer for forming a polymer P with a CTFE oligomer. That is, a Cl element is separated from a C—Cl bond of the CTFE oligomer, the vinyl-based monomer is added to a position where the Cl element is separated, and the monomer is polymerized so as to prepare the polymer P.

Further, in the preparation method, for example, by adjusting a addition rate of the vinyl-based monomer to the CTFE or a conversion rate of chloride atoms (Cl) in the CTFE oligomer to the corresponding radicals, the repetition unit b of the CTFE in which the polymer P is polymerized can be adjusted, and thus a polymer which the CTFE oligomeric part is connected at the terminal of the polymeric part P can be prepared. For example, by polymerizing the vinyl-based monomer to the CTFE oligomer such that the repetition unit b of the CTFE has a value as low as possible, the polymer in which the CTFE oligomer is bound at the terminal of the polymer P can be prepared.

In an example, the preparation method comprises: a step of forming a mixture by mixing an inactive catalyst, a chlorotrifluoroethylene oligomer, and a vinyl-based monomer; and a step of forming a polymer by reacting the chlorotrifluoroethylene oligomer with the vinyl-based monomer.

In the preparation method of the present application, during the step of forming a mixture, the inactive catalyst is added instead of an active catalyst, so that there is no need to perform a step of removing oxygen for preventing the deactivation of the active catalyst to its inactive form by oxygen from the beginning of the reaction. Therefore, it is convenient to prepare the polymer. Further, when polymerization is carried out by adding the active catalyst from the beginning of the reaction, the catalyst in an excessive amount reacts with sites to which the chloride atoms (Cl) of the CTFE oligomer are bound and forms radicals. This may cause coupling between CTFE oligomer molecules and resulting gelation and thereby an incomplete catalyst removal during purification. Meanwhile, in the preparation method of the present application, the inactive catalyst in a small amount is added to an initial mixture so as to suppress the initial reaction and then, while the polymerization progresses, a catalyst reducing agent in an adequate amount is added so as to gradually activate the catalyst. Therefore, it is possible to minimize multiple initiations of chlorine (Cl) sites within a CTFE oligomer and the resulting gelation, which happens when a large amount of catalyst reacts with Cl sites at a time.

In an example, during the step of forming a mixture, it is possible to form a mixture by mixing a CTFE oligomer as the starting material of the polymer, a vinyl-based monomer, and an inactive catalyst.

The CTFE oligomer means an oligomer having repetition units of a chlorotrifluoroethylene monomer as described above. Since the CTFE oligomer is a fluorine-based compound, it can be applied to the preparation method of the present application in order to give a hydrophobic property to a polymer film surface made of the polymer.

As described above, the vinyl-based monomer can be employed from vinyl-based monomers generally known in the art without limitation as long as they are monomers having a vinyl group.

Further, within the mixture, a content of the CTFE oligomer may be in a range of 0.005 parts by weight with respect to 20 parts by weight, and preferably, 1 part by weight with respect to 5 parts by weight with respect to 100 parts by weight of the vinyl-based monomer. Therefore, the polymer may contain a polymeric unit in which the chlorotrifluoroethylene oligomer is polymerized in a content of 0.005 parts by weight with respect to 20 parts by weight with respect to 100 parts by weight of the vinyl-based monomer. In the above-described range, the CTFE oligomer can be positioned at the terminal of the polymer P. When the content of the CTFE oligomer is more than 20 parts by weight, it may be difficult to prepare the polymer P.

Furthermore, as the inactive catalyst, a cationized metal-ligand complex compound may be used.

In the complex compound, the cationized metal may be, for example, a metal that has the highest oxidation number and cannot receive electrons any more. For example, Cu may have an oxidation number of 0, 1, or 2. The inactive catalyst may be a complex compound of Cu having the highest oxidation number of 2 and a ligand, that is ($Cu^{2+}$)-ligand complex compound. The cationized metal may be $Cu^{2+}$, $Fe^{3+}$, $Ru^{4+}$, and $Os^{4+}$, but is not limited thereto.

The ligand may be employed from various ligands generally known in the art and may include, for example, 2,2'-bipyridine, triphenylphosphine, 4,4-dinonyl-2,2'-bipyridine, tris(2-aminoethyl)amine, tris[2-(dimethylamino)ethyl]amine, N,N,N',N'',N''-pentamethyldiethylenetriamine, 1,1,4,7,10,10-hexamethyltriethylenetetramine, tris[(2-pyridyl)methyl]amine, or tetramethylethylenediamine, but is not particularly limited thereto.

In an example, the mixture may be prepared by mixing a solvent together as necessary.

The solvent may be employed from various solvents generally known in the art and may include, for example, N-methyl-2-pyrrolidone (NMP), gamma-butyrolactone (GBL), dimethyl formamide (DMF), dimethyl acetamide (DMAc), dimethyl sulfoxide (DMSO), ethyl acetate (EA) or tetrahydrofuran (THF), but is not be limited thereto.

In an example, the step of forming a polymer is a step for polymerizing the mixture formed in the step of forming a mixture. In the step of forming a polymer by reacting the CTFE oligomer with the vinyl-based monomer, a catalyst reducing agent is add to the mixture formed in the step of forming a mixture so as to activate the inactive catalyst and the activated catalyst partially reacts with the sites where the chloride atoms (Cl) of the CTFE oligomer are bound, so that a polymerization reaction can be started. As described above, when polymerization is carried out by adding the active catalyst from the beginning of the reaction, the catalyst in an excessive amount reacts with sites to which the chloride atoms (Cl) of the CTFE oligomer are bound and forms radicals. Thus, coupling between CTFE oligomer molecules and gelation caused thereby may occur. However, in the preparation method of the present application, the inactive catalyst in a very small amount is add to an initial mixture so as to suppress an initial reaction and then, while the polymer is formed, a catalyst reducing agent in an adequate amount is add so as to gradually activate the inactive catalyst. Therefore, it is possible to minimize a phenomenon in which the catalyst in a great amount reacts with the sites, to which the chloride atoms (Cl) of the CTFE oligomer are bound at a time and initiation reactions occur at the same time.

The catalyst reducing agent may be add during the step of forming of a polymer in order to activate the inactive catalyst so as to initiate a polymerization reaction by reacting the activated catalyst with the sites, to which the chloride atoms (Cl) of the CTFE are bound.

The catalyst reducing agent may include, for example, organic peroxides such as benzoyl peroxide, 1,1-bis(tertiary-butylperoxy)-3,3,5-triethylcyclohexane, tertiary butyl peroxyacetate, tertiary butyl peroxybenzoate, tertiarybutyl peroxy-2-ethylhexanoate, tertiary butyl peroxyisopropyl carbonate, di-2-ethylhexylperoxy dicarbonate, diisopropylperoxy dicarbonate, di-3-methoxybutylperoxy dicarbonate, di-3,3,5-trimethylhexanoyl peroxide, di-tertiary-butyl peroxide, lauroyl peroxide, dicumylperoxide, and methylethylketone peroxide; hydroperoxides such as butyl hydroperoxide, and cumyl hydroperoxide; azo compounds such as azobisisobutyronitrile (hereinafter, referred to as "AIBN"), 2,2'-azobis(2,4-dimethyl valeronitrile), and 1,1'-azobis(cyclohexane-1-carbonitrile); tin compounds such as tin dioctoate; electron donor compounds such as hydrazine; and antioxidant compounds such as ascorbic acid, but is not limited thereto.

The catalyst reducing agent may be add in a content of 3 to 300 parts by weight with respect to 10 parts by weight of the inactive catalyst. When the catalyst reducing agent is add in a content of less than 3 parts by weight, a content of the activated catalyst is low, and thus, polymerization cannot be started efficiently. When the catalyst reducing agent is add in a content of more than 300 parts by weight, activity of the catalyst is excessively high, and thus, coupling between CTFE oligomer molecules and gelation caused thereby may occur or a linear polymer may be formed instead of a graft polymer. Further, an additional step for removing the catalyst reducing agent is needed, and, thus, the process may be carried out uneconomically.

The step of forming a polymer can be carried out by, for example, modified Atom Transfer Radical Polymerization (hereinafter, referred to as "ATRP") methods such as an ICAR-ATRP method in which an inactive catalyst is activated by using an azo-based thermal polymerization initiator or an ARGET-ATRP method using a reducing agent.

For example, when the polymer is prepared by the ATRP method using the cationized metal-ligand complex compound, it is easy to polymerize a vinyl-based monomer to the CTFE oligomer by activating a C—Cl bond having a lower binding energy than a C—F bond of the CTFE oligomer, and, thus, the polymerization can be carried out efficiently. Further, by the ATRP method, it may become easy to adjust n which is the degree of polymerization and it is possible to adjust a weight ratio of the CTFE in the total polymer as required.

However, when a CTFE oligomer is graft-polymerized by a typical ATRP method using a cationized metal-ligand complex compound having a relatively low oxidation number, for example, $Cu^{1+}$-ligand complex compound, coupling between CTFE oligomer molecules and gelation caused thereby may occur, a radical concentration may be increased due to simultaneous activation of all ATRP initiation sites (Cl) in the CTFE oligomer, a reaction may be stopped due to the accumulation of an inactive catalyst, and a catalyst used in a content of thousands of ppm cannot be removed completely. In the preparation method of the present application, an inactive catalyst is used in a very small amount, the inactive catalyst can be activated continuously by using a catalyst reducing agent and a radical concentration can be microcontrolled through the step of forming a mixture and the step of forming a polymer, and, thus, the above-described problems can be solved.

In order to prepare the polymer, the step of forming a polymer may include a step of gradually converting a metal-ligand complex compound having a high oxidation number, for example, $Cu^{2+}$-ligand complex compound, to an ATRP activator as a metal-ligand complex compound having a low oxidation number, for example, $Cu^{1+}$-ligand complex compound. That is, by additionally adding a reducing agent instead of using a metal-ligand complex compound having a high oxidation number, in a very small amount (500 ppm or less with respect to a molar amount of the vinyl-based monomer), it is possible to solve the problem of coupling between CTFE oligomer molecules occurring when the polymerization is carried out by the above-described ATRP method and the problem of gelation caused by the coupling. Further, there has been a problem that a polymer having a high molecular weight cannot be prepared since a reaction is ended at a low conversion, but such a problem can be solved.

As the reducing agent, generally known chemical reducing agents such as tin(II) dioctoate, hydrazine, and ascorbic acid, radical thermal polymerization initiators, or the like may be used, but the present invention is not limited thereto. For example, the radical thermal polymerization initiators or the above-described catalyst reducing agent may be preferably used.

In an example, the step of forming a polymer may be carried out at a temperature of 25 to 150° C. for 0.1 to 100 hours.

In an example, the preparation method of the present application may further include a step of removing oxygen between the step of forming a mixture and the step of forming a polymer. When the inactive catalyst is activated by the catalyst reducing agent, the active catalyst sensitively reacts with oxygen and is deactivated. Therefore, by additionally performing the step of removing oxygen, polymerization efficiency can be increased. Further, by increasing a reaction temperature at the same time when the oxygen is removed, a reaction condition for forming a polymer can be controlled appropriately.

In the step of removing oxygen, the oxygen can be removed by various methods generally known in the art such as a vacuum method and a bubbling method as long as they can efficiently remove oxygen, but the present invention is not limited thereto. For example, the bubbling method may be used. The "vacuum method" means a method for removing an oxygen gas by vacuuming a solution after freezing it, and the "bubbling method" means a method for removing oxygen by continuously injecting nitrogen as an inert gas into a solution so as to decrease a solubility of oxygen.

In an example, the preparation method may further include a reaction termination step after the step of forming a polymer. In the reaction termination step, the reaction may be terminated by exposing the mixture to oxygen or bringing the mixture into contact with oxygen after the step of forming a polymer.

DETAILED DESCRIPTION OF EXEMPLARY EMBODIMENTS

Hereinafter, the present invention will be described in detail with reference to examples and comparative examples below. However, scopes of the above-described apparatus and method are not limited to the following examples.

Preparation Example 1

Preparation of Composition (A1) Containing Polymer

A mixture of 0.219 g of a CTFE oligomer having a number average molecular weight (Mn) of 500 to 600, 18.8 g of methyl methacrylate (MMA) as a vinyl-based monomer, 2.5 mg of copper(II) chloride ($CuCl_2$) as an inactive catalyst, 3.9 mg of N,N,N',N'',N''-pentamethyldiethylenetriamine (hereinafter, referred to as "PMDETA") as a ligand, and 19 g of N,N-dimethylformamide (hereinafter, referred to as "DMF") as a solvent was added into a 100 mL round bottom flask, and the flask was sealed. Then, in order to remove oxygen in a solution, nitrogen was bubbled for 30 minutes. Thereafter, the flask was immersed in an oil bath set at 60° C. Then, a 5% solution in DMF in which 15.4 mg of azobisisobutyronitrile (hereinafter, referred to as "AIBN"), an azo-based compound used as a catalyst reducing agent, had been dissolved was added into the flask and a reaction was initiated. After the flask was heated in the oil bath at 60° C. for 20 hours, the flask was opened in order for the solution to be exposed to oxygen, and the reaction was ended. As a result, a polymer containing the monomer having a conversion of 51%, a weight average molecular weight (Mw) of 27000, a molecular weight distribution (Mw/Mn) of 1.5, and a content of CTFE of 3% was prepared. The polymer was purified by precipitating into methanol, so that a film-forming composition containing the polymer in a concentration of 50% was prepared.

Preparation Example 2

Preparation of Composition (A2) Containing Polymer

A polymer containing the monomer having a conversion of 80%, a weight average molecular weight (Mw) of 33800, a molecular weight distribution (Mw/Mn) of 1.48, and a content of CTFE of 2.4% was prepared in the same manner as Preparation Example 1 except that a mixture of 0.219 g of a CTFE oligomer having a number average molecular weight (Mn) of 500 to 600, 18.8 g of MMA as a vinyl-based monomer, 2.5 mg of copper(II) chloride ($CuCl_2$) as an inactive catalyst, 3.9 mg of PMDETA as a ligand was used instead of the mixture of Preparation Example 1 and a solution in which 30.8 mg of AIBN as a catalyst reducing agent is mixed with 19 g of DMF as a solvent was added into the flask. The polymer was purified by precipitating into methanol, so that a film-forming composition containing the polymer in a concentration of 50% was prepared.

Preparation Example 3

Preparation of Composition (A3) Containing Polymer

A polymer containing the monomer having a conversion of 84%, a weight average molecular weight (Mw) of 54000, a molecular weight distribution (Mw/Mn) of 1.43, and a content of CTFE of 1.4% was prepared in the same manner as Preparation Example 1 except that a mixture of 0.218 g of Halocarbon™ 200 oil produced by Polyscience Company as a CTFE oligomer, 18.8 g of MMA as a vinyl-based monomer, 1.3 mg of copper(II) chloride ($CuCl_2$) as an inactive catalyst, 1.9 mg of PMDETA as a ligand was used instead of the mixture of Preparation Example 1, a solution in which 15.4 mg of AIBN as a catalyst reducing agent is mixed with 19 g of DMF as a solvent was added into the flask, and the flask was heated in the oil bath for 37 hours. The polymer was purified by precipitating into methanol, so that a film-forming composition containing the polymer in a concentration of 50% was prepared.

Preparation Example 4

Preparation of Composition (A4) Containing Polymer

A polymer containing the monomer having a conversion of 84%, a weight average molecular weight (Mw) of 55000, a molecular weight distribution (Mw/Mn) of 1.44, and a CTFE content of 1.4% was prepared in the same manner as Preparation Example 3 except that a mixture of 0.218 g of Halocarbon™ 1000N oil produced by Polyscience Company as a CTFE oligomer, 18.8 g of MMA as a vinyl-based monomer, 1.3 mg of copper(II) chloride (CuCl$_2$) as an inactive catalyst, 1.9 mg of PMDETA as a ligand was used instead of the mixture of Preparation Example 3 and a solution in which 15.4 mg of AIBN as a catalyst reducing agent is mixed with 19 g of DMF as a solvent was added into the flask. The polymer was purified by precipitating into methanol, so that a film-forming composition containing the polymer in a concentration of 50% was prepared.

Preparation Example 5

Preparation of Polymer

A mixture of 0.219 g of a CTFE oligomer having a number average molecular weight (Mn) of 500 to 600, 18.8 g of methyl methacrylate (MMA) as a vinyl-based monomer, and 19 g of DMF as a solvent was added into a 100 mL round bottom flask, and the flask was sealed. Then, in order to remove oxygen in a solution, nitrogen was bubbled for 30 minutes. Thereafter, the flask was immersed in an oil bath set at 60° C. A catalyst solution separately prepared under nitrogen atmosphere by dissolving 56 mg of copper(I) chloride (CuCl) as an active catalyst, 12 mg of copper(II) chloride (CuCl$_2$) as an inactive catalyst for adjusting a reaction rate and the level of control, 130 mg of PMDETA as a ligand in 4 g of DMF was added into the flask and a reaction was initiated. After the flask was heated in the oil bath at 60° C. for 20 hours, the flask was opened in order for the solution to be exposed to oxygen, and the reaction was ended to prepare the demanded polymer.

Preparation Example 6

Preparation of Composition (B3) Containing Polymer

As for Preparation Example 5, although the inactive catalyst was mixed in a content of about 14 wt. % with respect to the amount of the active catalyst in order to adjust a reaction rate, the conversion measured by $^1$H-NMR was 0%, and a polymer was not formed. Therefore, in Preparation Example 6, as a vinyl-based monomer, styrene was used in order to further reduce a reaction activity.

A polymerization reaction was carried out in the same manner as Comparative Example 1 Preparation Example 1 except that 19 g of styrene was used as a vinyl-based monomer and a reaction temperature was adjusted to 120° C. As a result, 20 hours later, the reaction was ended and a polymer was prepared. The prepared polymer contained the monomer having a conversion of 83%, a weight average molecular weight (Mw) of 63000, a molecular weight distribution (Mw/Mn) of 2.73, and a content of CTFE of 1.4%. The polymer was purified by precipitating into methanol, so that a film-forming composition containing the polymer in a concentration of 50% was prepared.

Example 1

Preparation of Film

An aluminum plate was coated with 3 mL of the prepared composition and then dried in an oven heated at a temperature of 150° C. so as to prepare a film sample having an even surface.

Example 2

A film sample having an even surface was prepared in the same manner as Example 1 except that the composition (A2) prepared in Preparation Example 2 was used.

Example 3

A film sample having an even surface was prepared in the same manner as Example 1 except that the composition (A3) prepared in Preparation Example 3 was used.

Example 4

A film sample having an even surface was prepared in the same manner as Example 1 except that the composition (A4) prepared in Preparation Example 4 was used.

Comparative Example 1

A composition (B1) containing a mixture of 0.3 g of a CTFE oligomer having a number average molecular weight (Mn) of 500 to 600 and 9.7 g of poly(methyl methacrylate) (PMMA) in a concentration of 50% was prepared, and a film sample having an even surface was prepared in the same manner as Example 1.

Comparative Example 2

A composition (B2) containing a mixture of 0.3 g of Halocarbon™ 1000N oil produced by Polyscience Company as a CTFE oligomer and 9.7 g of poly(methyl methacrylate) (PMMA) in a concentration of 50% was prepared, and a film sample having an even surface was prepared in the same manner as Example 1.

Comparative Example 3

A film sample having an even surface was prepared in the same manner as Example 1 except that the composition (B3) prepared in Preparation Example 6 was used.

Test Example

Properties of the compositions or the films prepared in Examples and Comparative Examples were evaluated by the following method.
Measurement Method 1. Measurement of Number Average Molecular Weight and Weight Average Molecular Weight
A number average molecular weight and a weight average molecular weight of a polymer were measured by using a GPC on the following conditions. A measurement result was converted to prepare a calibration curve by using standard polystyrenes of Agilent system.
<Weight Average Molecular Weight Measurement Conditions>
Measurement apparatus: Agilent GPC (Agilent 1200 series, U.S.A.)
Column: Two-connected PL Mixed B
Column temperature: 40° C.
Eluent: Tetrahydrofuran
Flow rate: 1.0 mL/min
Concentration: ~1 mg/mL (50 μL injection)
Measurement Method 2. Measurement of Surface Energy
A contact angle was measured on the following conditions to measure surface energy of each film sample.

<Surface Energy Measurement Condition>
Temperature: Constant temperature of 25° C.
Humidity: Constant humidity of 40%
Polar solvent: Distilled water
Non-polar solvent: Diiodomethane Measurement Method 3. Measurement of Content of CTFE in Polymer A content of CTFE in a polymer could be measured by a formula of (an amount of a CTFE oligomer add/[an amount of an CTFE oligomer add+(an amount of a monomer add×a conversation of a monomer)]. In the case of an unknown sample, a content of CTFE was measured by using a content of fluorine (F) through elementary analysis. That is, since a mass ratio of fluorine per CTFE unit was 49%, a content of CTFE was defined as being 2.04 times the content of F.

Measurement Method 4. Measurement of Phase Separation Phenomenon

After films were prepared, the film samples were differentiated between transparent and opaque samples as a result of observation with naked eyes. The opaque sample was determined as a sample in which a phase separation phenomenon occurred.

The polymer films prepared in Examples 1 to 5→1 to 4 and Comparative Examples 1 to 6->1 to 3 were compared in terms of surface energy and whether or not a phase separation phenomenon occurred as shown in Table 1 below.

TABLE 1

| Sample | Molecular weight distribution (Mw/Mn) | b/(a + b) | Content of CTFE in polymer (wt. %) | Surface energy (mN/m) | Occurrence of phase separation phenomenon |
|---|---|---|---|---|---|
| PMMA | — | — | — | 54 | x |
| PS | — | — | — | 45 | x |
| Example 1 Composition (A1) | 1.50 | 0.29 | 3 | 47 | x |
| Example 2 Composition (A2) | 1.48 | 0.36 | 2.4 | 50 | x |
| Example 3 Composition (A3) | 1.43 | 0.30 | 1.4 | 50 | x |
| Example 4 Composition (A4) | 1.44 | 0.30 | 1.4 | 51 | x |
| Comparative Example 1 Composition (B1) | — | — | — | 54 | ○ |
| Comparative Example 2 Composition (B2) | — | — | — | 55 | ○ |
| Comparative Example 3 Composition (B3) | 2.73 | 0.40 | 1.4 | 45 | x |

As shown in Table 1, as for Examples 1 to 4 in which the film samples were formed by using the compositions A1 to A4 each containing the polymer of the present application, a content of CTFE was 1.5 to 3 wt. % but surface energy levels were lower than Comparative Examples. Therefore, it can be seen that surfaces of the prepared polymer films had an excellent hydrophobic property modification effect.

Meanwhile, as for Comparative Examples 1 and 2 in which a CTFE oligomer simply blended in a mixture was added, surface energy levels were as high as that of reference PMMA and a hydrophobic property modification effect could not be seen from surfaces of the prepared polymer films.

Further, as for Examples 1 to 4, a CTFE compound was not simply mixed but add as a covalent bond at a terminal of a polymer, and, thus, a phase separation phenomenon did not occur in a polymer solution.

Meanwhile, as a result of the test on the sample, which was not according to the preparation method of the present application, formed by using the composition of Comparative Example 3 prepared to have a molecular weight distribution of more than 1.6, a surface modification effect could not be observed. This was because in the case of a polymer having a high molecular weight distribution as described above, a coupling reaction between polymers was carried out actively and a branched polymer was formed, and, thus, a fluorine-based oligomer was positioned at the center of the branched polymer and could not exhibit well a hydrophobic property.

A polymer of the present application includes a compound having a hydrophobic property at its terminal, and thus, it is possible to provide a film having a surface a hydrophobic property without an separate surface treatment at the same time when the film is formed. Further, when a film is formed by using a composition containing the polymer, it is possible to permanently obtain a hydrophobic property modification effect of a film surface at low costs and also possible to provide a composition that does not cause a phase separation phenomenon in a polymer solution state.

What is claimed is:

1. A polymer represented by the following Chemical Formula 2:

[Chemical Formula 2]

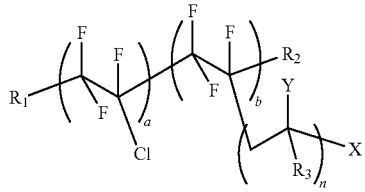

wherein in Chemical Formula 2,
$R_1$ and $R_2$ each independently represent —F or —$CF_3$,
a satisfies an integer of 1 to 95, and
b satisfies an integer of 1 to 5,
$R_3$ represents an alkyl group having 1 or 2 carbon atoms,
X represents hydrogen or halogen,
Y includes one or more selected from the group consisting of a phenyl group, halogen, an alkoxy group having 1 to 12 carbon atoms, an alcohol group, $CO_2Z$ (Z represents alkyl which is substituted or not substituted by a hetero element or halogen and has 1 to 12 carbon atoms), and $CONR_5R_6$ ($R_5$ and $R_6$ independently represent hydrogen or alkyl having 1 to 12 carbon atoms) which are substituted or not substituted by hydrogen, an alkyl group or an alkoxy group having 1 to 12 carbon atoms, a hydroxyl group, or $SO_3R_4$ ($R_4$ represents hydrogen or alkyl having 1 to 12 carbon atoms), and
n satisfies an integer of 10 to 50000,
wherein the polymer has a molecular weight distribution in a range of 1.01 to 1.6;
a content of chlorotrifluoroethylene in the polymer is in a range of 0.005 to 30 wt %, and
a relation of b/(a+b) is in a range of 0.05 to 0.4.

2. The polymer represented by Chemical Formula 1 of claim 1, wherein the a satisfies an integer of 1 to 8 and the b is 1 or 2.

3. A composition comprising the polymer of claim 1.

4. The composition of claim 3, wherein a content of the polymer is in a range of 1 wt % to 100 wt % with respect to the total weight of the composition.

5. The composition of claim 3, further comprising a surfactant in a range of 0.1 to 10 parts by weight with respect to 100 parts by weight of the composition.

6. A film formed by using the composition of claim 3.

7. The film of claim 6, wherein the film is used for a water repellent coating film or an anti-contamination film.

8. A preparation method of the polymer of claim 1, comprising:

forming a mixture by mixing an inactive catalyst, a chlorotrifluoroethylene oligomer, and a vinyl-based monomer; and forming a polymer by adding a catalyst reducing agent into the mixture to activate the inactive catalyst and reacting the chlorotrifluoroethylene oligomer with the vinyl-based monomer, wherein the polymer contains a polymerization unit in which the chlorotrifluoroethylene oligomer is polymerized in a content of 0.005 to 20 parts by weight with respect to 100 parts by weight of the vinyl-based monomer.

9. The preparation method of a polymer of claim 8, wherein the inactive catalyst is a cationized metal-ligand complex compound.

10. The preparation method of a polymer of claim 9, wherein the cationized metal is one selected from the group consisting of $Cu^{2+}$, $Fe^{3+}$, $Ru^{4+}$, and $Os^{4+}$.

11. The preparation method of a polymer of claim 8, wherein a content of the catalyst reducing agent is in a range of 3 to 300 parts by weight with respect to 10 parts by weight of the inactive catalyst.

12. The preparation method of a polymer of claim 8, wherein the catalyst reducing agent includes one or more selected from the group consisting of benzoyl peroxide, 1,1-bis(tertiary-butylperoxy)-3,3,5-triethylcyclohexane, tertiary butyl peroxyacetate, tertiary butyl peroxybenzoate, tertiary-butyl peroxy-2-ethylhexanoate, tertiary butyl peroxyisopropyl carbonate, di-2-ethylhexylperoxy dicarbonate, diisopropylperoxy dicarbonate, di-3-methoxybutylperoxy dicarbonate, di-3,3,5-trimethylhexanoyl peroxide, di-tertiary-butyl peroxide, lauroyl peroxide, dicumylperoxide, methylethelketone peroxide/methylethylketone peroxide, butyl hydro peroxide, cumyl hydro peroxide, azobisisobutyronnitrile, 2,2'-azobis(2,4-dimethyl valeronitrile), 1,1'-azobis(cyclohexane-1-carbonitrile), and the like, tin dioctoate, hydrazine, and ascorbic acid.

* * * * *